(12) United States Patent
Chari (10) Patent No.: US 8,000,376 B2
(45) Date of Patent: Aug. 16, 2011

(54) ADJUSTING A TRANSMIT TIME OF A WIRELESS DEVICE

(75) Inventor: Sujai Chari, San Franciso, CA (US)

(73) Assignee: NDSSI Holdings, LLC, San Jose, CA (US)

( * ) Notice: Subject to any disclaimer, the term of this patent is extended or adjusted under 35 U.S.C. 154(b) by 811 days.

(21) Appl. No.: 12/009,712

(22) Filed: Jan. 22, 2008

(65) Prior Publication Data

US 2009/0185599 A1    Jul. 23, 2009

(51) Int. Cl.
*H04B 1/713* (2006.01)
*H04K 1/10* (2006.01)
(52) U.S. Cl. ........................ 375/136; 375/260
(58) Field of Classification Search .......... 375/132–136, 375/260, 262; 370/208
See application file for complete search history.

(56) References Cited

U.S. PATENT DOCUMENTS

| 6,941,110 | B2 * | 9/2005 | Kloper et al. ............. 455/67.11 |
| 2006/0098570 | A1 | 5/2006 | Hadad |
| 2006/0188003 | A1 | 8/2006 | Larsson et al. |
| 2007/0042733 | A1 * | 2/2007 | Tomioka ..................... 455/179.1 |
| 2007/0183338 | A1 * | 8/2007 | Singh et al. .................... 370/252 |
| 2007/0211641 | A1 | 9/2007 | Fu et al. |

\* cited by examiner

*Primary Examiner* — Young T. Tse
(74) *Attorney, Agent, or Firm* — Brian R. Short (57) ABSTRACT

Methods of adjusting a transmit time of a wireless device are disclosed. One method includes a receiver determining a frequency hopping sequence of an interfering signal. The receiver obtains an observed pattern of at least one of time and frequency overlap between the interfering signal and a signal of interest. The receiver determines a desired pattern of at least one of time and frequency overlap between the interfering signal and the signal of interest. A desired transmit time delay of the signal of interest is adjusted based on a difference between the observed pattern and the desired pattern.

19 Claims, 9 Drawing Sheets

ADJUSTING A TRANSMIT TIME OF A WIRELESS DEVICE

FIELD OF THE DESCRIBED EMBODIMENTS

The described embodiments relate generally to wireless communications. More particularly, the described embodiments relate to a method and apparatus for adjusting a transmit time of a wireless device.

BACKGROUND

One form of wireless communication is wireless communication transmitted and received according to the ultra-wide band (UWB) protocol. The Federal Communications Committee (FCC) has mandated that UWB radio transmission can legally operate in the frequency range of 3.1 GHz to 10.6 GHz. The transmit power requirement for UWB communications is that the maximum average transmit Effective Isotropic Radiated Power (EIRP) is −41.25 dBm/MHz in any transmit direction.

The result of the low transmission signal power and wide bandwidth can cause UWB signals to suffer from low signal to interference and noise ratios (SINR). Additionally, UWB signals can suffer from high signal dispersion. That is, the UWB signals can have multiple signal paths within an RF transmission channel between the transmitter and the receiver causing each transmitted impulse to spread out into multiple impulses over time.

Typically, devices of UWB networks are located proximate to other devices of the UWB networks. Therefore, the networks likely suffer from self-interferences. That is, UWB wireless transmission from one device can interfere with the UWB transmission of other devices. The interfering devices can include transmissions that are not synchronized, which is some situation makes the interferences even worse.

It is desirable to have methods of controlling transmission of wireless signals for reducing the effects of interfering wireless signals.

SUMMARY

An embodiment includes a method of adjusting a transmit time of a wireless device. The method includes a receiver determining a frequency hopping sequence of an interfering signal. The receiver obtains an observed pattern of at least one of time and frequency overlap between the interfering signal and a signal of interest. The receiver determines a desired pattern of at least one of time and frequency overlap between the interfering signal and the signal of interest. A desired transmit time delay of the signal of interest is adjusted based on a difference between the observed pattern and the desired pattern.

Another embodiment includes a method of coordinating wireless transmission of multi-carrier symbols between a transmitter and a receiver. The method includes a receiver obtaining a pattern of an interfering signal relative to a signal of interest. A desired transmit time delay of the signal of interest is selected based on characteristics of the pattern. The transmitter adjusts timing of transmission of multi-carrier symbols by the desired transmit time delay.

Another embodiment includes a method of setting a transmit time of a wireless device. The method includes a transmitter obtaining a pattern of an interfering signal relative to a signal of interest, and adjusting a desired transmit time delay of the signal of interest based on characteristics of the pattern.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods of adjusting a transmit time (or transmit delay) of a signal of interest based at least in part upon a pattern of an interfering signal relative to a signal of interest (SOI).

Figure 1:
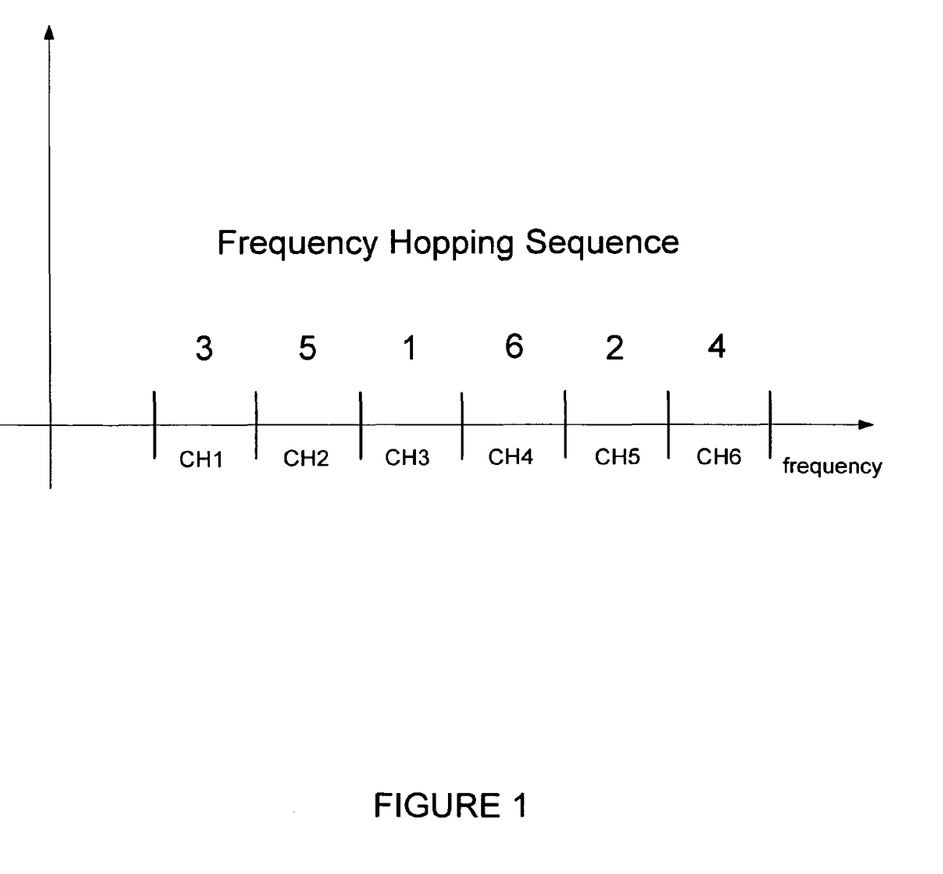
FIG. 1 shows a frequency spectrum of frequency bands, and an example of a sequence for transmission of data symbols within these bands.

FIG. 1 shows a frequency spectrum of communication frequency bands (hereafter referred to, interchangeably, as frequency hopping bands or frequency bands), and an example of a sequence of frequency bands for transmission of data symbols. As shown, this example includes six communicating frequency bands (labeled CH1 through CH6) that are defined by a frequency hopping sequence. Frequency-hopping is a method of transmitting radio signals by switching a carrier among many frequency bands, using a deterministic or pseudorandom sequence known to both transmitter and receiver. In this example, symbols of the signal are transmitted such that the energy of the first symbol occupies frequency band 3, the next symbol's energy occupies frequency band 5 and so forth. After the sixth symbol, which occupies frequency band 4, the pattern may repeat or it may be followed with a continuation of a pseudorandom sequence.

An embodiment of a UWB network includes transmission of wireless signals according to a multi-carrier (orthogonal frequency division multiplexing (OFDM)) format, in which at least some of the OFDM signals are transmitted according to a frequency hopping sequence. The UWB network can include devices using frequency hopping transmission of multi-carrier symbols, and other devices transmitting multi-carrier symbols over a single frequency band. The overlap in time and frequency of the OFDM symbols of the wireless signals of the different devices can cause periodic interference.

Figure 2:
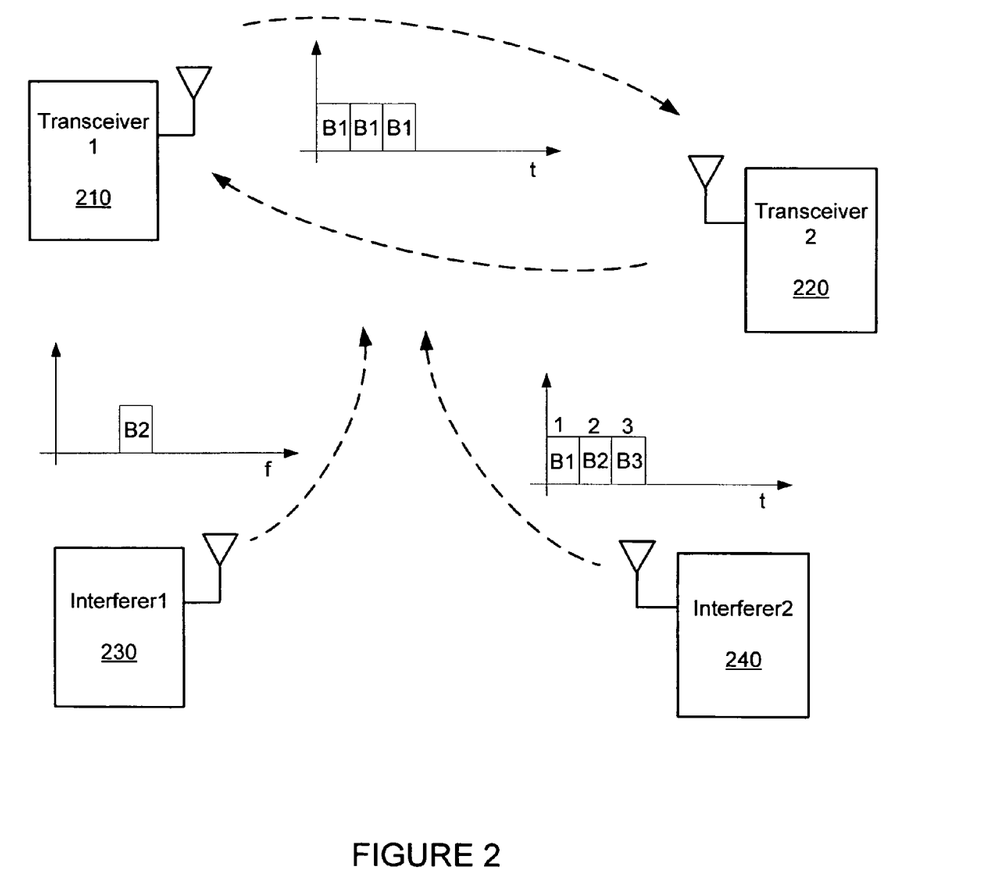
FIG. 2 shows a pair of wireless transceivers that can receive interference from interfering transmitters that can influence the establishment of synchronization between the pair of wireless transceivers.

FIG. 2 shows a pair of wireless transceivers 210, 220 that can receive interference from interfering transmitters 230, 240. As shown, the transceivers 210, 220 communicate by wireless transmission through a single frequency band B1. The multiple bands B1 can represent different multi-carrier symbols transmitted over time, over the same frequency band. The interfering transmitter 230 transmits in band B2, and the interfering transmitter 240 transmits in bands B1, B2, B3 in the order 1, 2, 3 as shown. Although the interfering transmitter 230 probably does not cause much interference because it does not transmit over the frequency band B1, there may be some interference due to adjacent channel power in band B1 due to the transmission signals within band B2. That is, typically the transmission is not perfectly contained within the intended transmission band. The adjacent channel power and imperfect receiver filtering of frequency bands outside of SOI frequency transmission band(s) can lead to at least some interference by the interfering transmitter 230.

The interfering transmitter 240 can cause interference while transmitting in the frequency band B1, which is also used to transmit the SOI. The interference typically occurs according to a pattern with respect to time due to the periodic nature of the frequency hopping transmission. The periodic interference typically results when at least one of the intended wireless communication or the interfering wireless communication, transmit according to a frequency hopping sequence. The periodic interference can also result due to a pattern of transmission by the interferer. The frequency hopping sequences can include multi-carrier symbols (such as, OFDM symbols) that are not synchronized.

Figure 3A:
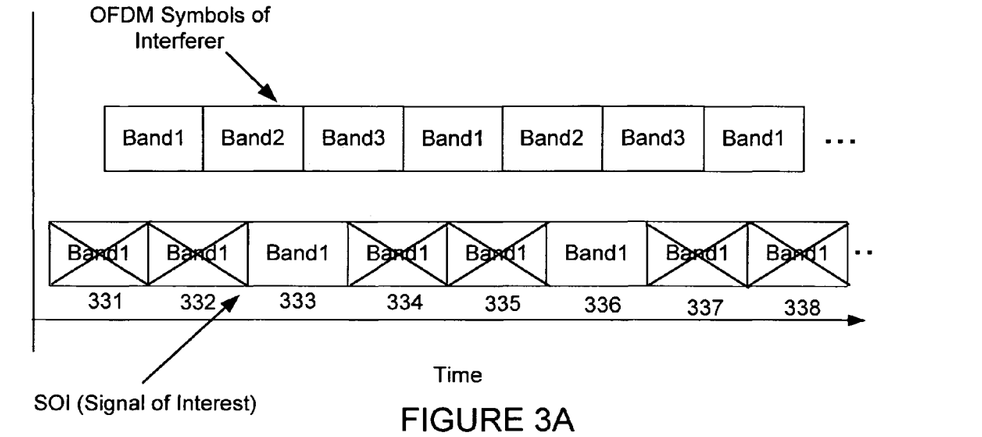
FIG. 3A shows a time-line of a SOI that includes wireless transmission of symbols over a single band, and an interfering signal that includes transmission of symbols over multiple bands (B1, B2, B3) according to a frequency hopping sequence.

FIG. 3A shows a time-line of a SOI that includes wireless transmission of symbols over a single band (B1), and an interfering signal that includes transmission of symbols over multiple bands (B1, B2, B3) according to a frequency hopping sequence. While the example shown and described includes only the interfering signal having a frequency hopping sequence, it is to be understood that both the SOI and/or the interfering signal can include a frequency hopping sequence.

As shown, the multi-carrier symbols of the interfering signal are not synchronized with the multi-carrier symbols of the interfering signal. That is, symbol boundaries (which can be designated by each represented band) are not necessarily aligned. The symbol boundaries can be random and time varying. As a result, an interfering symbol transmitted over the frequency band B1 can interfere with multiple multi-carrier symbols of the SOI. If the received signal power of the interfering signal is substantially greater than the received signal power of the SOI, then the received symbols of the SOI may not be useable since they overlap with the interfering symbols. The result can be the SOI suffering from a very low SINR during the periods of interference which can preclude proper decoding of the SOI during the periods of interference. As will be described, due to a lack of symbol boundary synchronization between the SOI and the interfering signal, the SOI can suffer from low SINR for multiple symbols per symbol transmitted of the interfering signal in the overlapping band(s).

Figure 3B:
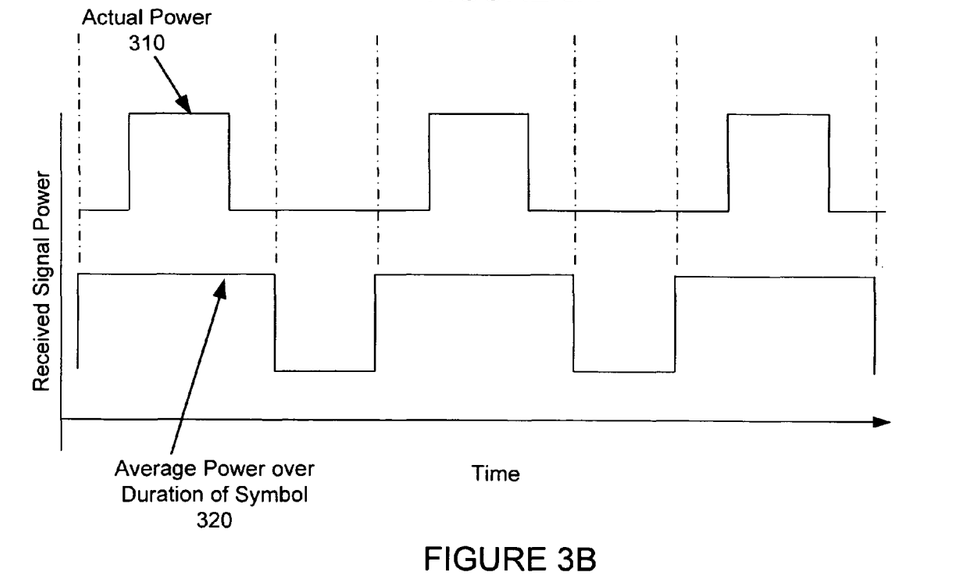
FIG. 3B shows a time-line of an example of received signal power (SOI and interfering signal) through a select band (B1) over time.

FIG. 3B shows a time-line of an example of received signal power (SOI and interfering signal) through a select band (B1) over time. A first plot 310 shows a representation of the actual power received assuming the received signal power of the interfering signal is much greater than the received signal power of the SOI. A second plot 320 shows a representation of received signal power averaged over the duration of a symbol of the SOI. As shown, if the signal power of the interfering signal is substantially larger than the signal power of the SOI, then the average received signal power (the received signal power includes both the SOI and the interfering signal) of the transmission frequency band B1 at the receiver is very high, causing interference of SOI symbols 331, 332, 334, 335, 337, 338. Only during periodic symbols of the SOI is the received signal power at a lower level (symbols 333, 336). During the lower levels of received signal power (due to the interfering signal occupying a different frequency band) the SOI is the dominant received signal due to the lack of the interfering signal. The example of FIGS. 3A and 3B shows the worst-cased interference situation.

Figure 4A:
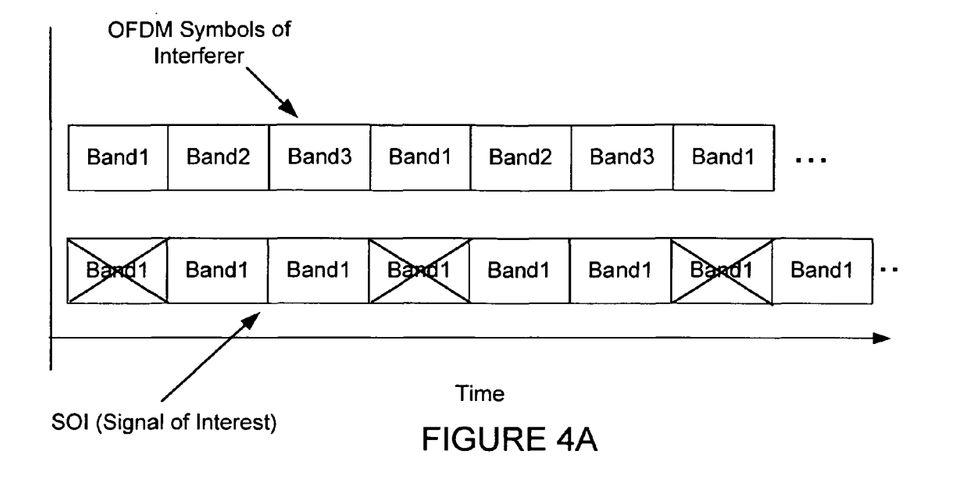
FIG. 4A shows a time-line of a SOI that includes time delay adjusted wireless transmission of symbols over a single band, and an interfering signal that includes transmission of symbols over multiple bands (B1, B2, B3) according to a frequency hopping sequence.

FIG. 4A shows a time-line of a SOI that includes time delay adjusted wireless transmission of symbols over a single band, and an interfering signal that includes transmission of symbols over multiple bands (B1, B2, B3) according to a frequency hopping sequence. As shown, the multi-carrier symbols of the SOI are time delayed so that the transmission boundaries of the symbols of the SOI are essentially aligned with the transmission of the symbols of the interfering signal. Therefore, each symbol of the interfering signal transmitted over the frequency band B1, only interferes with a one symbol of the SOI. Therefore, the number of symbols of the SOI impacted by the interference is reduced by a factor of 2 compared to the worst case scenario shown in FIG. 3A.

Figure 4B:
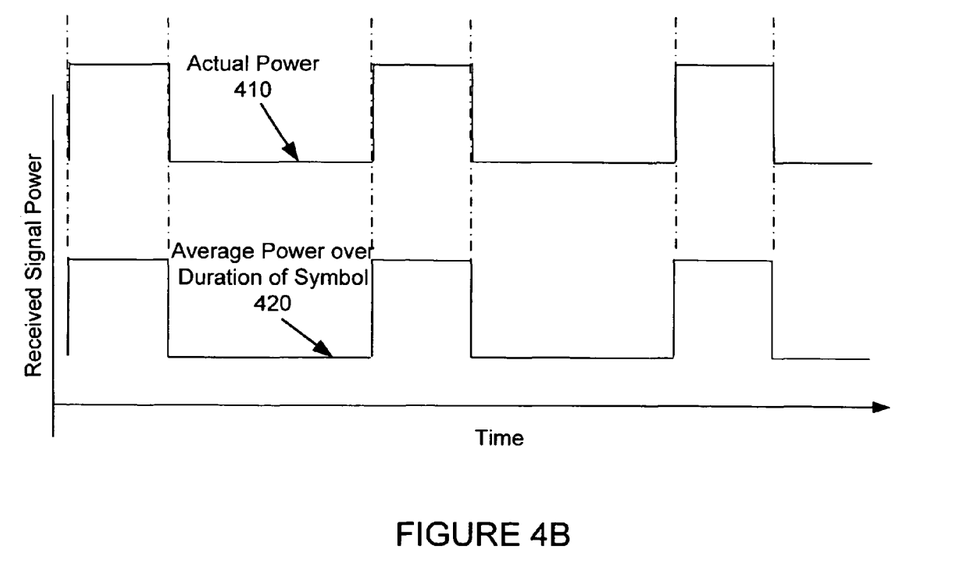
FIG. 4B shows a time-line of an example of received signal power (time delay adjusted SOI and interfering signal) through the select band (B1) over time.

FIG. 4B shows a time-line of an example of received signal power averaged over the time duration of the symbols of the SOI (time delay adjusted SOI and interfering signal) through a select band (B1) over time. Comparing FIG. 4B with FIG. 3B shows the number of symbols of the SOI affected by the interfering signal is decreased due to the near synchronization of the SOI with the interfering signal. FIG. 4B shows that the first plot 410 of the actual power received is essentially the same as the second plot 420 of the received signal power averaged over the duration of a symbol of the SOI. Although in this example, the number of overlapping symbols between the SOI and the interfering signal is reduced by aligning the symbol boundaries, there are cases (for example, when the SOI is transmitted according to a frequency hopping sequence) in which having an offset between the symbol boundaries of the SOI and the interfering signal can result in less overlap.

If the received power level of the interfering signal is not much greater than the received power level of the SOI (that is, it has an equivalent received power level or less), the delay adjustment can be selected to achieve the lack of alignment of symbols as shown in FIG. 3A because an improved packet error rate (PER) can result in some situations. That is, situations can exist in which spreading the interference over multiple symbols actually improves the PER because spreading the interference across symbols may improve the decoding of the received symbols of the SOI. In this case, the lowest SINR for any received symbol of the SOI has been increased at the expense of the best SINR for any received symbol of the SOI being decreased. In other words, the standard deviation of the SINR across the received symbols of the SOI has been reduced by spreading the interference over multiple symbols. Therefore, monitoring the PER can be used to additionally influence the delay adjustment selection. The PER can be predicted based on a pattern of SINR profile of the SOI and knowledge of coding of the SOI.

A packet error rate (PER) estimate can be made, for example, based on knowledge of transmitter coding, and the pattern of estimates of the noise spectrum and transmission channel response based on received data. PER estimates can be determined for multiple transmission data rates and multiple time-frequency codes, based on determining the above characteristics for a single transmitted data packet.

Estimates of the PER can be made on multi-carrier signals (such as, orthogonal frequency division multiplexed (OFDM) signals). An exemplary embodiment includes the PER estimate being made based upon transmission channel state information (channel coefficients), coding (rate and type), noise power of the sub-carriers and the type of modulation.

An exemplary method of estimating PER of transmission signals based upon a single data packet includes receiving multi-carrier modulated signals over a period of time, and estimating an SNR for each received sub-carrier. A constructing a sequence of the SNRs can be constructed, a link PER can be estimated based upon knowledge of encoding used during transmission and the sequence.

The PER of a link can be estimated based on transmission of a single packet. By estimating the PER, and therefore, the capacity of a link using only one packet, the link throughput can be optimized more quickly and consequently reduce the latency. In addition, if the channel is being shared among multiple devices, determining the optimal throughput for each link in a timely manner ensures that each device is transmitting on the channel a smaller fraction of the time, therefore, increasing the overall throughput of the network.

Figure 5A:
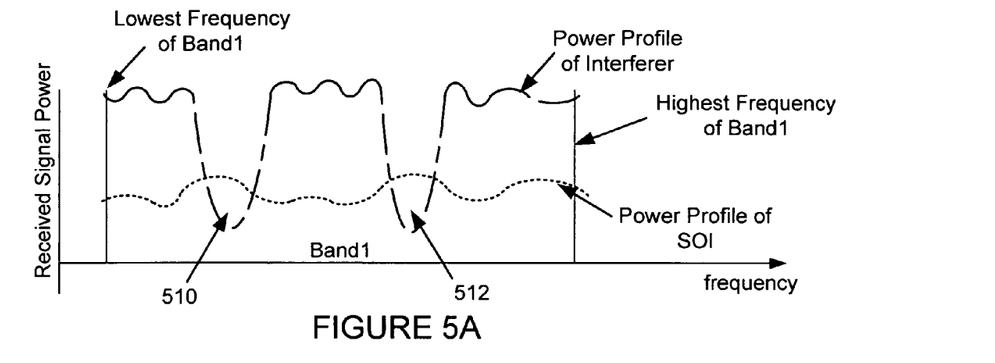
FIG. 5A shows one example of a frequency spectrum of, for example, the power profile of the SOI and the interfering signal, for the frequency band B1 when the interfering signal is transmitting within the frequency band B1.

FIG. 5A shows one example of a frequency spectrum of, for example, the power profile of the SOI and the interfering signal, for the frequency band B1 when the interfering signal is transmitting within the frequency band B1. As shown, the power profile of the interfering signal can be frequency dependent. As a result, frequency components of the power profile within the frequency spectrum occupied, for example, by frequency band B1 can include portions 510, 512 in which the power profile of the SOI is greater than the interfering signal. This suggests that there may be conditions in which the SINR of certain carriers of multi-carrier symbols is relatively high. This condition can suggest that overall, the packet error rate (PER) of the multi-carrier symbols may benefit by adjusting the transmission delay of the multi-carrier symbols so that the interfering symbol overlap in time and frequency with more SOI symbols rather than fewer.

Figure 5B:
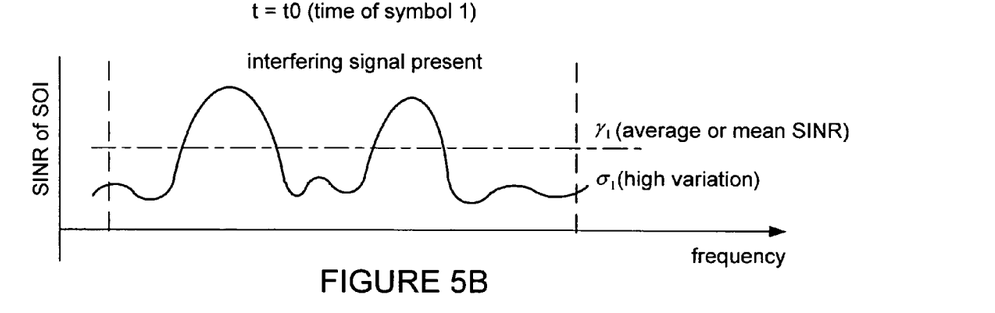
FIG. 5B shows an example of a plot of SINR of the SOI that corresponds with frequency spectrum of FIG. 5A.

FIG. 5B shows an example of a plot of SINR of the SOI that corresponds with frequency spectrum of FIG. 5A. The SINR is a plot of the SOI while, for example, the frequency hopping interfering signal is transmitting within the same frequency band B1 as the SOI. The plot shows that in some situations (due to the frequency selectivity of the transmission channel of the interfering signal) the SINR of the SOI may be better overall (over all the sub-carrier of the multi-carrier symbol) when the interfering signal is overlapping with multiple symbols of the SOI. The SINR plot of FIG. 5B is designated as occurring at time t=t0 to differentiate it from the SINR plot of FIG. 5C which is designated as occurring at time t=t1. The average SINR and the standard deviation of the SINR in the plot of FIG. 5B are designated as $\gamma_1$ and $\sigma_1$ respectively.

Figure 5C:
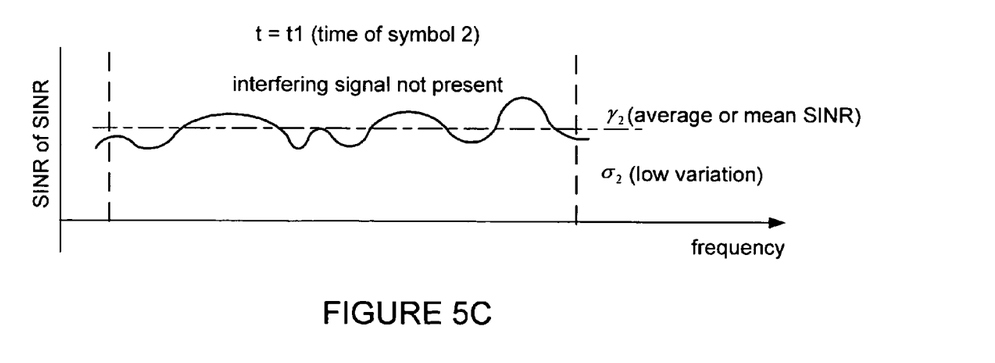
FIG. 5C shows an example of a plot of SINR of the SOI that corresponds with when the interfering signal is not transmitting within the frequency band B1.

5C shows an example of a plot of SINR of the SOI that corresponds with when the interfering signal is not transmitting within the frequency band B1. As shown, the overall SINR of the carriers of the multi-carrier symbols of the SOI can actually get worse when the interfering signal is not overlapping with the SOI. The average SINR and the standard deviation of the SINR in the plot of FIG. 5C are designated as $\gamma_2$ and $\sigma_2$ respectively.

The criteria used for determining whether the transmit time (or delay) should be selected to either distribute the interference among multiple symbols or to limit the interference to one SOI symbol per transmitted interferer symbol in overlapping bands, can be based on a comparative analysis of the values of $\gamma_1$, $\sigma_1$, $\gamma_2$, and $\sigma_2$. For example, one embodiment includes distributing the interference among multiple symbols if comparisons of $\gamma_1$, $\gamma_2$, $\sigma_1$, $\sigma_2$ against predetermined thresholds are satisfied. One example of such a comparison includes distributing the interference among multiple symbols if $\gamma_1/\gamma_2$ is greater than a threshold $C_1$, and $\sigma_1/\sigma_2$ is greater than a threshold $C_2$. Otherwise, the transmit time is selected to limit the interference to one SOI symbol per transmitted interferer symbol in overlapping bands.

Figure 6:
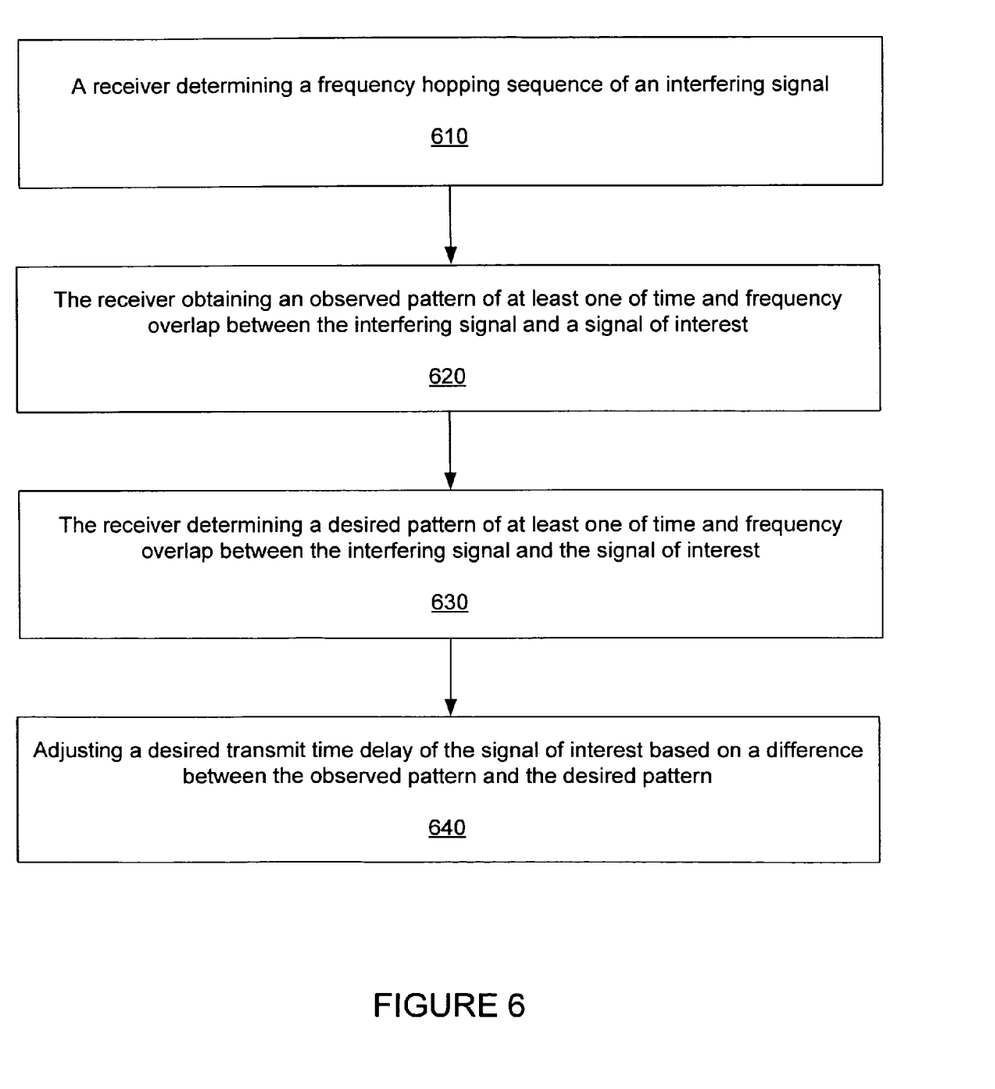
FIG. 6 is a flow chart that shows one example of steps of a method of adjusting a transmit time of a wireless device.

FIG. 6 is a flow chart that shows one example of steps of a method of adjusting a transmit time of a wireless device. A first step 610 includes a receiver determining a frequency hopping sequence of an interfering signal. A second step 620 includes the receiver obtaining an observed pattern of at least one of time and frequency overlap between the interfering signal and a signal of interest. A third step 630 the receiver determining a desired pattern of at least one of time and frequency overlap between the interfering signal and the signal of interest. A fourth step 640 includes adjusting a desired transmit time delay of the signal of interest based on a difference between the observed pattern and the desired pattern.

The receiver can obtain the frequency hopping sequence of the interfering signal, and the pattern of the interfering signal relative to a signal of interest can be determined in several different ways. For example, the receiver can obtain a priori knowledge of the frequency hopping sequence and/or the pattern. The a priori knowledge is obtained, for example, by communicating with other devices on the common networks.

The receiver can obtain the pattern of the interfering signal relative to a signal of interest by the receiver monitoring a received signal for a period of time. The received signal includes the signal of interest and the interfering signal. The monitoring can include measuring a signal power of the received signal for a long enough period of time to allow the receiver to recognize the observed pattern. An alternate embodiment includes the receiver monitoring the received signal when the receiver has information indicating that the signal of interest is not present. Another alternate embodiment includes the receiver monitoring the received signal when the receiver has information indicating that the interfering signal is not present. These isolated measurements are useful in determining a SOI to interference signal power ratio more accurately which can be useful in selecting the delay adjustment.

Once the observed pattern has been obtained, the desired transmit time delay can be selected. For one embodiment, the desired transmit time delay is selected to reduce a number of multi-carrier symbols of the signal of interest that are impacted by the interfering signal. For one implementation of this embodiment, the selection includes determining relative symbol boundary timing between multi-carrier symbols of the interfering signal and multi-carrier symbols of the signal of interest. The pattern of interfering multi-carrier symbols of the interfering signal is identified as previously described. Based on the timing of the multi-carrier symbols and the pattern of the interfering multi-carrier symbols, the desired transmit time delay is selected to minimize at least one of time and frequency overlap between multi-carrier symbols and the interfering multi-carrier symbols.

The relative symbol boundary timing between multi-carrier symbols of the interfering signal and multi-carrier symbols of the signal of interest (SOI) can be determined by measuring the power per received symbol over time. Patterns of the average received power can be observed. This requires, however, that the receiver be synchronized to the SOI. Generally, synchronization includes the process of detecting the start of the SOI, including timing of symbol boundaries of the SOI.

Selecting a subset (that is, symbols that are not impacted by interference) of received symbols for synchronization can improve robustness of the synchronization in the presence of interference. More specifically, the receiver searches for correlation peaks only for received symbols that are the least affected by interference.

After the receiver has established synchronization to the SOI, the average received power patterns can be analyzed to determine the transmit time adjustment. If, for example, the averaged power per symbol pattern is $P_1P_1P_2P_1P_1P_2 \ldots$ where the power for interfered symbols is represented by $P_1$ and power for symbols without interference is represented by $P_2$, and $P_1 \gg P_2$, then the symbol offset may be ½ symbol. If the pattern is, for example, $P_1P_2P_2P_1P_2P_2 \ldots$, then no adjustment may be needed.

For another embodiment, the desired transmit time delay is adjusted to minimize a packet error rate of the signal of interest. The interference signal may not have substantially greater signal strength than the signal of interest. Therefore, the transmit delay time selected based on minimizing symbol overlap between the SOI and the interference (that is, trying to align symbol boundaries of the SOI and interferer to minimize the number of SOI symbols impacted by interference) may not provide the best packet error rate of the received signal.

An exemplary method of estimating PER of transmission signals based upon a single data packet includes receiving multi-carrier modulated signals over a period of time, estimating an SNR for each received sub-carrier, constructing a sequence of the SNRs based on interleaving at a transmitter of the signal of interest, and estimating link PER based upon knowledge of encoding used during transmission and the sequence. An advantage of this method is that the PER of a link can be estimated based on transmission of a single packet. By estimating the PER, and therefore, the capacity of a link using only one packet, the link throughput can be optimized more quickly and consequently reduce the latency. In addition, if the channel is being shared among multiple devices, determining the optimal throughput for each link in a timely manner ensures that each device is transmitting on the channel a smaller fraction of the time, therefore, increasing the overall throughput of the network.

Generally, the PER link estimate is made at a receiver of the multi-carrier modulated signals. That is, the link can be more easily characterized on the receiving end. The result can be fed back to the transmitter. Alternatively, the receiver can feed back measured results of the received signals, and the results can be fed back to the transmitter for characterization. The final PER estimate can be made at either the receiving device, or at the transmitting device. Clearly, if made at the transmitting device, some information regarding the received multi-carrier signals must be fed back to the transmitting device. For example, interference measurements taken at the receiver and the transmitter are typically different (as opposed to the wireless channel which is typically the same whether measured at the transmitter of receiver unless multiple antennas are used at the transmitter and/or the receiver. Therefore, the receiver can communicate information regarding the measured interference which can be incorporated by the transmitter in computing the PER estimate.

An exemplary embodiment of transmission signals includes multi-carrier modulated signals. To alleviate the effects of ISI, an implementation of UWB includes orthogonal frequency division multiplexing (OFDM) signal transmission. OFDM is a special form of multi-carrier modulation in which multiple user symbols are transmitted in parallel using different sub-carriers. The sub-carriers have overlapping frequency spectra, but their signal waveforms are specifically chosen to be orthogonal. OFDM systems transmit symbols that have substantially longer time durations than the length of the impulse response of the transmission channel, thereby allowing avoidance of ISI. OFDM modulation techniques are very efficient in indoor broad band wireless communication. It is to be understood that OFDM is one example of a multi-carrier transmission signal.

An exemplary embodiment includes estimating SNR for each received carrier based upon a transmission channel, noise variance and interference. Since the SNR can vary from carrier to carrier, estimating the SNR on a carrier by carrier basis leads to the calculation of a better PER estimate. For example, for a frequency selective transmission channel, the SNR can vary greatly between over just a few carriers of a multi-carrier signal.

A transmission channel of the multi-carrier signals can be estimated based upon knowledge of training signals transmitted through the channel, and the received signals. Noise and interference of the transmission channel can be estimated based upon the estimated channel, the training signals, and the received signals. The SNR of each carrier can then be estimated.

An exemplary embodiment includes the construction of the sequence SNRs being dependent upon the interleaving of the transmitter. That is, the order of the interleaving can be used to set the order of the sequence of the SNRs. If the sequence of SNRs is constructed by the receiving device, the receiver performs the construction based on knowledge of the interleaving within the transmitting device.

Figure 9:
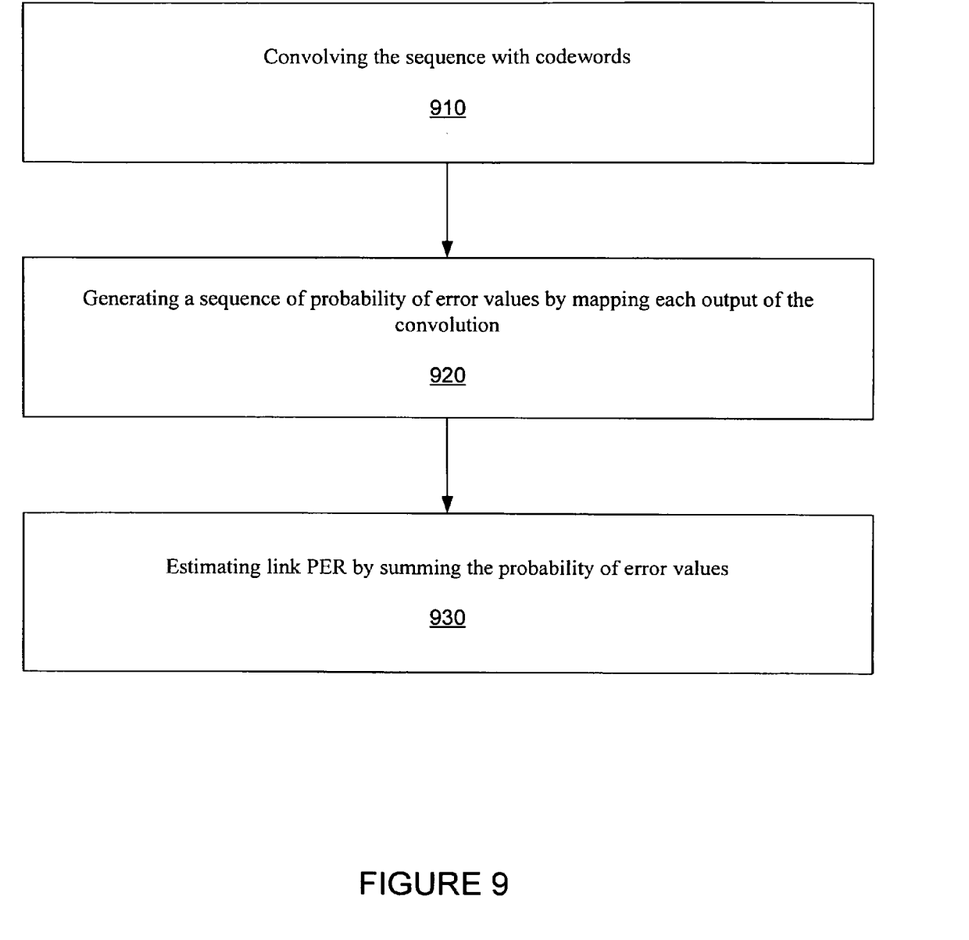
FIG. 9 is a flow chart showing an exemplary method of estimating link PER based upon knowledge of encoding used during transmission, and sequence of SNRs.

An exemplary embodiment includes estimating link PER based upon knowledge of encoding used during transmission, and the sequence of SNRs. FIG. 9 is a flow chart showing an exemplary method of estimating link PER based upon knowledge of encoding used during transmission, and sequence of SNRs. A first step 910 includes convolving the sequence with codewords. The codewords are constructed based upon knowledge of the encoding at the transmitter. A second step 920 includes generating a sequence of probability of error values by mapping each output of the convolution. A third step 930 includes estimating link PER by summing the probability of error values.

Generally, there are a predetermined number of codewords. A library can be used to reference the predetermined number of codewords. The total number of possible codewords for a transmission system is dependent upon the length (number of bits) of the interleaver, the length (number of bits) of the packets and the code. Generally, only a subset of the total number of codewords is actually selected for use. Generally, the set (library) of codewords that are selected are the codewords that are determined to be the most dominant contributors in determining PER estimates. The PER contributions for each codeword, can be determined by convolving the codewords with the sequence of SNRs. A subset of the codewords is typically selected to reduce complexity.

An exemplary embodiment includes the codewords having entries of 1s and 0s. Therefore, the convolution includes summing some (as determined by which entries are a 1) of the SNRs of the sequence of the SNRs. Other embodiments include codewords having values different than 1 or 0. An exemplary embodiment of convolving the sequence with codewords, includes convolving the sequence with each codeword of the library of codewords.

The convolution results in a sequence in which the values of the elements within the sequence are dependent upon the values of the sequence of SNRs and the values within the codewords. Each of the values of the sequence can be mapped to provide a sequence of probabilities of error. An exemplary embodiment includes the mapping being performed through the use of a look up table (LUT). That is, a probability of error is generated by the LUT for each value of the sequence. The LUT maps the value of each element of the sequence to a probability of error.

The LUT can be generated, for example, by approximating the output of a Q function for all possible LUT input values. The Q-function is well known in communication systems, and includes a finite integral of a Gaussian probability density function.

Each entry in the sequence provides an estimate of a probability of error at that point in the sequence. Packets can be defined to include M bits. The interleaver can be defined to include N bits. The number of bits within the packets can be M/N or X times the number of bits within the interleaver. Since constructing a sequence of SNRs of length N involves X repetitions of a unique sequence of SNRs of length N (assuming the SNR per sub-carrier does not change in over the duration of one packet), the convolution can be performed using only a length N SNR sequence and then multiplying the resulting probability of error by a factor of X. Generally, the convolution is circular to avoid "edge" effects.

The PER estimate can be scaled by the ratio of packet length M to interleaver length N.

The PER of the link can be estimated by summing the probability of error values of the sequence.

Another embodiment the method of adjusting a transmit time of a wireless device further includes estimating a clock timing offset between the signal of interest and the interfering signal, and additionally adjusting the desired transmit time delay, wherein the additional adjustment is proportional to the clock timing offset. The desired adjustment can drift over the length of a packet. The drift can to some extent by compensated for by additionally adjusting the transmit delay time proportional to the clock timing offset.

The clock timing offset between the signal of interest and the interfering signal can be determined by the receiver determining an interference signal clock offset relative to receiver clock by decoding preamble information of packets of the interference signal, the receiver determining a signal of interest clock offset relative to receiver clock by decoding preamble information of packets of the signal of interest, and estimating the clock timing offset by a difference between the interference signal clock offset and the signal of interest clock offset.

The receiver can determine the desired transmit time delay, and feed the desired transmit time delay back to the transmitter by the receiver adjusting a time delay of acknowledgements to received packets of the signal of interest based upon the pattern. As previously described, the receiver can estimate a clock timing offset between the signal of interest and the interfering signal. The receiver can additionally adjust the time delay of the acknowledgements, wherein the additional adjustment is proportional to the clock timing offset.

Estimating symbol boundary offset (based on the power pattern) as previously described, is typically estimated during a preamble of a packet. However, the acknowledgements or other means of feeding back the transmit delay typically occur at the end of the same packet or even later. During the delay between the estimate of the desired delay and when the desired or selected delay is feedback to the transmitter, the symbol offset may have drifted in proportion to the relative clock offset between the SOI and the interfering signal transmitter clocks. To mitigate the effects of the drift, the transmit time delay can be additionally adjusted based on the estimate of the drift as obtained by the clock offset.

For another embodiment, once the receiver determines the desired transmit time delay, the receiver provides the transmitter of the signal of interest (SOI) with the desired transmit time delay. The rate the receiver provides the transmitter with the desired transmit time delay can be dependent on how rapidly the desired transmit delay varies with time. An embodiment includes the receiver filtering the desired transmit delay to obtain a more accurate (less noisy) desired transmit delay estimate, and providing the transmitter with the filtered desired transmit delay time.

Figure 7:
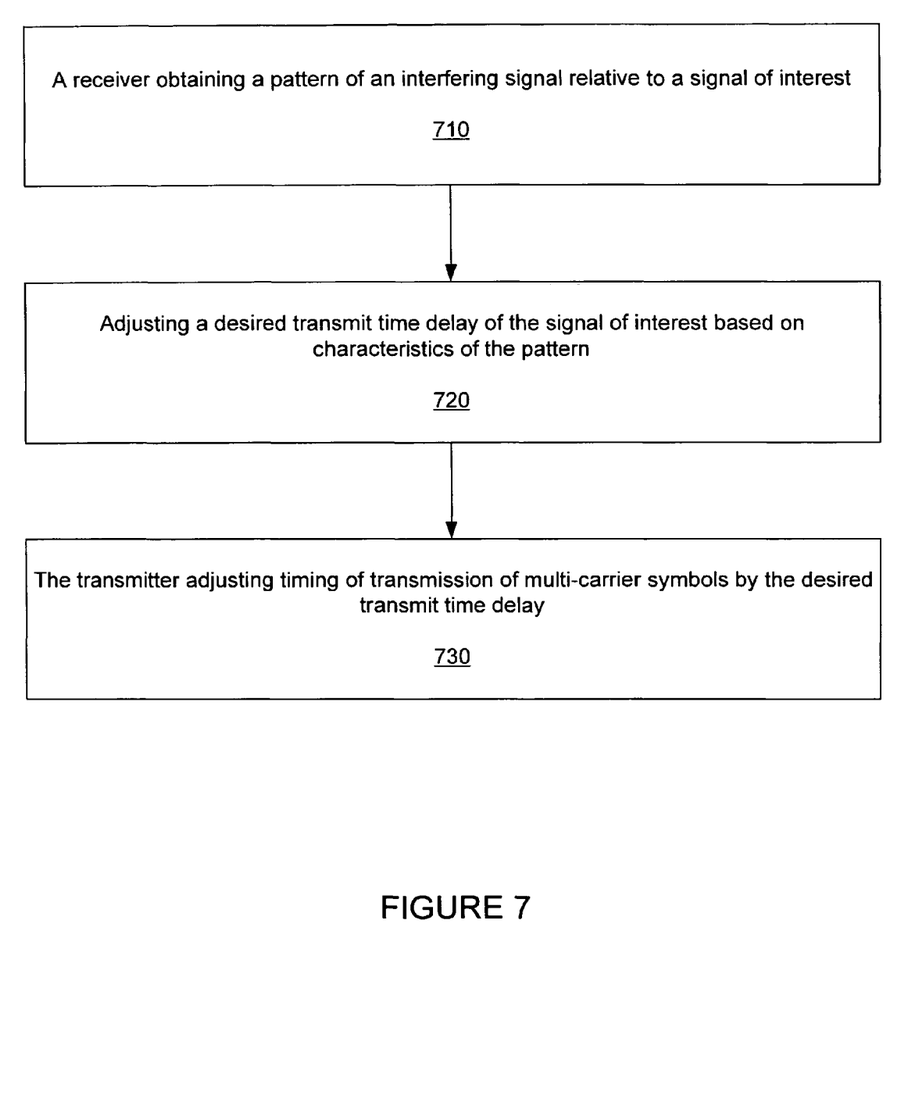
FIG. 7 is a flow chart that shows another example of steps of a method of coordinating wireless transmission of multi-carrier symbols between a transmitter and a receiver.

For another embodiment, the receiver provides transmitter of the signal of interest, with the pattern. The transmitter can then determine the desired transmit delay FIG. 7 is a flow chart that shows another example of steps of a method of coordinating wireless transmission of multi-carrier symbols between a transmitter and a receiver. A first step 710 includes a receiver obtaining a pattern of an interfering signal relative to a signal of interest. A second step 720 includes adjusting a desired transmit time delay of the signal of interest based on characteristics of the pattern. A third step 730 includes the transmitter adjusting timing of transmission of multi-carrier symbols by the desired transmit time delay.

Additionally, an SINR per received sub-carrier can be estimated based on the pattern, a received signal power, an interference signal power, and a channel response of the signal of interest. As previously described, the SINR of the SOI can be time varying as shown in FIGS. 5B and 5C. The sequence of time varying (that is, periodic) SINR profile is de-interleaved (based on knowledge of the transmitter interleaver) to construct a sequence of SINR values. This sequence of SINR values can be used to predict the probability of error after, for example, Viterbi decoding (again, based on knowledge of coding at the transmitter), and therefore, provide a PER estimate.

A received PER can be estimated based on the SINR per sub-carrier and coding of information of the sub-carriers at the transmitter. The desired transmit time delay can be adjusted to reduce a PER of the signal of interest.

A channel response of the interfering signal based can be estimated based on the pattern.

Figure 8:
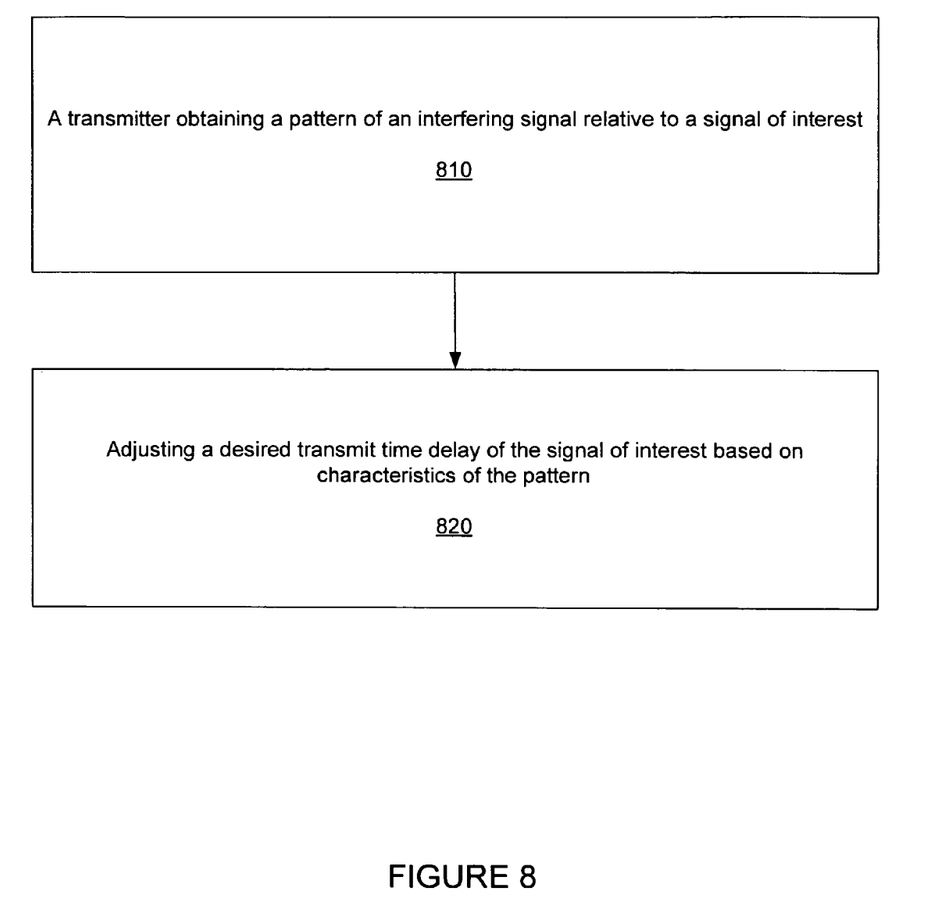
FIG. 8 is a flow chart that shows another example of steps of a method of setting a transmit time of a wireless device.

FIG. 8 is a flow chart that shows another example of steps of a method of setting a transmit time of a wireless device. A first step 810 includes a transmitter obtaining a pattern of an interfering signal relative to a signal of interest. A second step 820 includes adjusting a desired transmit time delay of the signal of interest based on characteristics of the pattern.

This embodiment provides for the transmitter directly determining the pattern of the interfering signal relative to the signal of interest. This embodiment also provides that the transmission time is directly determined rather than a delay. It is to be understood, however, that determining the transmission time and determining the delay of the transmission time are essentially interchangeable.

Although specific embodiments have been described and illustrated, the embodiments are not to be limited to the specific forms or arrangements of parts so described and illustrated.

What is claimed:

1. A method of adjusting a transmit time of a transmitter of a signal of interest (SOI), comprising:
    determining, by a receiver, a frequency hopping sequence of an interfering signal;
    measuring, by a the receiver, a received signal power of a receive signal through a select band of the frequency hopping sequence over time, wherein the receive signal includes the signal of interest and the interfering signal, wherein the signal of interest comprises multi-carrier symbols and the interfering signal comprises interfering multi-carrier symbols;
    identifying, by the receiver, a pattern of the interfering multi-carrier symbols of the interfering signal from the received signal power;
    based on the transmit time of the multi-carrier symbols and the pattern of the interfering multi-carrier symbols, selecting a desired transmit time delay to reduce at least one of time and frequency overlap between the multi-carrier symbols and the interfering multi-carrier symbols; and
    adjusting, by the transmitter, the transmit time of the signal of interest based on the desired transmit time delay.

2. The method of claim 1, wherein determining the frequency hopping sequence of the interfering signal comprises obtaining a priori knowledge of the frequency hopping sequence of the interfering signal.

3. The method of claim 1, wherein the receiver measures the received signal power of the received signal for a long enough period of time to allow the receiver to identify the pattern.

4. The method of claim 1, wherein the receiver monitors the received signal when the receiver has information indicating that the signal of interest is not present.

5. The method of claim 1, wherein the receiver monitors the received signal when the receiver has information indicating that the interfering signal is not present.

6. The method of claim 1, wherein selecting the desired transmit time delay further comprises selecting the desired transmit time delay to reduce a number of the multi-carrier symbols of the signal of interest that are impacted by the interfering signal.

7. The method of claim 1, further comprising:
    estimating a clock timing offset between the signal of interest and the interfering signal; and
    adjusting the transmit time based on the clock timing offset.

8. The method of claim 7, wherein estimating the clock timing offset between the signal of interest and the interfering signal comprises:
    determining, by the receiver, an interference signal clock offset relative to a receiver clock by decoding preamble information of packets of the interfering signal;
    determining, by the receiver, a signal of interest clock offset relative to the receiver clock by decoding the preamble information of packets of the signal of interest; and
    estimating the clock timing offset by a difference between the interference signal clock offset and the signal of interest clock offset.

9. The method of claim 1, wherein the receiver provides the transmitter with the desired transmit time delay by adjusting an acknowledgement time delay of acknowledgements to received packets of the signal of interest.

10. The method of claim 9, further comprising:
    estimating, by the receiver, a clock timing offset between the signal of interest and the interfering signal; and
    adjusting, by the receiver, the acknowledgement time delay of the acknowledgements, wherein adjusting the acknowledgement time delay of the acknowledgements is based on the clock timing offset.

11. The method of claim 1, further comprising providing the transmitter of the signal of interest with the desired transmit time delay.

12. The method of claim 11, wherein the receiver which provides a rate to the transmitter with the desired transmit time delay is dependent on how rapidly the desired transmit time delay varies with time.

13. The method of claim 11, further comprising filtering by the receiver, the desired transmit time delay and providing the transmitter with the filtered desired transmit time delay.

14. The method of claim 1, further comprising providing the transmitter of the signal of interest, with the pattern.

15. A method of coordinating wireless transmission of a signal of interest, wherein the signal of interest includes multi-carrier symbols, between a transmitter and a receiver, comprising:
    measuring, by the receiver, a received signal power of a receive signal through a select band of a frequency hopping sequence over time, wherein the receive signal includes the signal of interest and an interfering signal, wherein the interfering signal comprises interfering multi-carrier symbols;
    identifying a pattern of the interfering multi-carrier symbols of the interfering signal from the received signal power;
    adjusting a desired transmit time delay of the signal of interest based on characteristics of the pattern; and
    adjusting, by the transmitter, a timing of transmission of the multi-carrier symbols by the desired transmit time delay.

16. The method of claim 15, further comprising estimating a Signal to Interference and Noise Ratio (SINR) for each sub-carrier of the multi-carrier symbols based on the pattern, the received signal power, an interference signal power, and a channel response of the signal of interest.

17. The method of claim 16, further comprising estimating the channel response of the interfering signal based on the pattern.

18. The method of claim 16, further comprising estimating a received Packet Error Rate (PER) based on the SINR for each sub-carrier of the multi-carrier symbols and coding of information of the sub-carriers of the multi-carrier symbols at the transmitter.

19. The method of claim 18, further comprising:
    adjusting the desired transmit time delay to reduce the estimated PER of the signal of interest.

* * * * *